US007095719B1

(12) United States Patent
Wilhelmsson et al.

(10) Patent No.: US 7,095,719 B1
(45) Date of Patent: Aug. 22, 2006

(54) METHOD AND APPARATUS FOR DYNAMIC PACKET SELECTION IN UNCOORDINATED RADIO SYSTEMS

(75) Inventors: Leif Wilhelmsson, Dalby (SE); Joakim Persson, Lund (SE); Jacobus Haartsen, Hardenberg (NL); Olof Dellien, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 811 days.

(21) Appl. No.: 09/706,071

(22) Filed: Nov. 3, 2000

Related U.S. Application Data

(60) Provisional application No. 60/212,774, filed on Jun. 20, 2000.

(51) Int. Cl.
*H04Q 7/20* (2006.01)
*H04J 13/00* (2006.01)
*H04Q 7/24* (2006.01)

(52) U.S. Cl. ............. 370/252; 370/349; 370/465; 455/423; 455/450

(58) Field of Classification Search ............. 370/349, 370/465, 252, 342, 441–442, 345, 498; 455/423, 455/452.2, 451, 450
See application file for complete search history.

(56) References Cited

U.S. PATENT DOCUMENTS

| 5,465,398 | A | * | 11/1995 | Flammer | 455/69 |
| 5,701,294 | A | * | 12/1997 | Ward et al. | 370/252 |
| 5,920,597 | A | * | 7/1999 | Khayrallah et al. | 375/265 |
| 6,084,865 | A | * | 7/2000 | Dent | 370/321 |
| 6,163,577 | A | * | 12/2000 | Ekudden et al. | 375/242 |
| 6,262,994 | B1 | * | 7/2001 | Dirschedl et al. | 370/465 |
| 6,519,236 | B1 | * | 2/2003 | Haartsen et al. | 370/332 |
| 6,539,205 | B1 | * | 3/2003 | Wan et al. | 370/465 |
| 6,567,375 | B1 | * | 5/2003 | Balachandran et al. | 370/204 |
| 2001/0040880 | A1 | * | 11/2001 | Chen et al. | 370/337 |
| 2002/0036992 | A1 | * | 3/2002 | Balachandran et al. | 370/329 |
| 2003/0139136 | A1 | * | 7/2003 | Pattabiraman | 455/41 |

FOREIGN PATENT DOCUMENTS

| JP | 11-164373 | 6/1999 |
| WO | WO 97/13388 | 4/1997 |
| WO | WO 98/38763 | 9/1998 |
| WO | WO 00/18033 | 3/2000 |

OTHER PUBLICATIONS

Eckhardt, D.A. et al; "Improving Wireless LAN Performance via Adaptive Local Error Control"; Oct. 13, 1998; Proceedings, 6th Int'l Conf on Network Protocols; pp. 327-338.*

(Continued)

*Primary Examiner*—Seema S. Rao
*Assistant Examiner*—Robert C. Scheibel, Jr.

(57) ABSTRACT

Method and apparatus for dynamically selecting a packet type based on the quality estimates of the channel are disclosed. From these channel quality estimates, specific properties of the packet may be selected including whether a coding scheme should be used, the packet length, and the modulation used. The packet type selection is then performed in a dynamic fashion based on updates or changes to the channel conditions.

58 Claims, 4 Drawing Sheets

OTHER PUBLICATIONS

Haartsen, J.C., "The Bluetooth Radio System," *IEEE Personal Communications*, vol. 7, No. 1, Feb. 2000, pp. 28-36.

Modiano, E., *An adaptive algorithm for optimizing the packet size used in wireless ARQ protocols*, Wireless Networks (1999) 5:279-286.

Eckhardt, D., et al., *Improving Wireless LAN Performance via Adaptive Local Error Control*, publication unknown, date unknown.

Jaap Haartsen, "BLUETOOTH—The universal radio interface for ad hoc, wireless connectivity," Ericsson Review No. 3, pp. 110-117, (1998).

Stefan Zürbes, "Considerations on Link and System Throughput of Bluetooth Networks," Proceedings of the 11th IEEE International Symposium on Personal Indoor and Mobile Radio Communications, London, UK, vol. 2, Sep. 18-21, 2000, pp. 1315-1319, XP002186689.

Bluetooth, Core Specification Version 1.0 B, vol. 1, "Specification of the Bluetooth System," Section 3, "Link Manager Protocol," pp. 186-244, Dec. 1, 1999.

Andrew Seybold, "Bluetooth Technology: The Convergence of Communications and Computing," Andrew Seybold's Outlook, May 1998.

U.S. Appl. No. 09/156,695, filed Sep. 18, 1998, Haartsen et al.

* cited by examiner

METHOD AND APPARATUS FOR DYNAMIC PACKET SELECTION IN UNCOORDINATED RADIO SYSTEMS

This application for patent claims the benefit of priority from, and hereby incorporates by reference the entire disclosure of, co-pending U.S. Provisional Application for Patent Ser. No. 60/212,774, filed Jun. 20, 2000.

BACKGROUND OF THE PRESENT INVENTION

1. Field of the Invention

The present invention is related to digital communication in uncoordinated radio systems and, in particular, to a method and apparatus for optimizing system performance by adapting the packet type to the conditions of the communication channel.

2. Description of the Related Art

In certain wireless communications systems, the data to be communicated are typically transmitted over a channel in bursts of packets. The packets may vary both in the length of each packet in the burst and the encoding of the packets. For example, in a high bit error rate environment, it may be advisable to use shorter length packets in order to reduce the number of corrupted packets received. Similarly, where the channel environment renders an error correction scheme ineffective, it may be advisable to switch to uncoded instead of coded packets. Moreover, channel conditions are subject to changes that may make a previously optimum packet type suddenly unsuitable for the new channel conditions. Therefore, it is desirable to be able to provide a way to select the packet type, and to do so dynamically based on the condition of the wireless channel.

Dynamic packet selection would be especially useful to reduce the effect of interference in uncoordinated or ad hoc networks like the Bluetooth™ wireless network that operates in the unlicensed 2.45 GHz, ISM (Industrial, Scientific and Medical) band. Referring now to FIG. 1, an ad hoc network 10 is shown comprising a number of electronic devices including a laptop computer 12, a personal digital assistant 14, and a mobile phone 16, all of which are interconnected by wireless links represented here by the jagged lines. The nature of the ad hoc network 10, as the name implies, is such that the network connections may be quickly added to and removed from the network 10. For example, additional mobile phones 16 may be easily added to the ad hoc network 10 simply by bringing the new mobile phones to within a certain range or distance of the network 10.

However, because the ad hoc network 10 operates in an unlicensed (unregulated) frequency band, other devices and networks that may be using the same band may unexpectedly interfere with the operation of the network. In fact, since it is possible for an interfering device to be much closer to the receiving device than the intended transmitting device, the signal-to-interference ratio (SIR) can be extremely small, on the order of −20 dB. Also, for a system operating in an unlicensed band such as the 2.45 GHz ISM band, the interferer may be a device with significantly higher output power, such as microwave ovens. In that case, the SIR can be up to 20 dB beyond the range where the network is working properly.

One method of reducing the effect of interference in an ad hoc network is to use some type of spread spectrum technique. There are essentially two ways that a spread spectrum system can mitigate interference: interference suppression and interference avoidance.

An example of interference suppression can be found in Direct Sequence Spread Spectrum (DSSS) where the information signal is spread over a wide band by the spreading sequence. Signals that are not spread according to the spreading sequence are suppressed at the receiver side. Here, the instantaneous bandwidth of the carrier greatly exceeds the bandwidth of the information to be communicated. However, the processing gain (PG), which is the ratio of the carrier bandwidth to the information bandwidth, is obtained through the spreading sequence. Therefore, for a multiple access system based on DSSS to work properly, the interfering signal should not be too much stronger than the desired one because suppression of the interferer will be limited by the PG. (See, e.g., J. C. Haartsen, "The Bluetooth Radio System," *IEEE Personal Communications*, Vol. 7, No. 1, February 2000.)

A multiple access technique which is based on interference avoidance can be found in Frequency Hopped Spread Spectrum (FHSS) where the amount of time the information signal dwells on any carrier frequency is kept very short (less than 10 ms) to reduce the probability of being "hit" by an interferer. In FHSS, the instantaneous carrier bandwidth is on the same order as the information bandwidth (unlike in DSSS). Instead, the PG is obtained by letting the carrier frequency hop over a total bandwidth which is in great excess of the instantaneous bandwidth.

Although the above techniques may be effective in their own way, none provide a method or apparatus for selecting a packet type based on the channel conditions or changes thereto in order to minimize the effects of interference.

SUMMARY OF THE INVENTION

The present invention is related to a method or an apparatus for dynamically selecting a packet type based on the quality estimates of the channel. From these channel quality estimates, specific properties of the packet may be selected including whether a coding scheme should be used, the packet length, and the modulation used. The packet type selection is then performed in a dynamic fashion based on updates or changes to the channel conditions.

In one aspect, the invention is related to a method for improving a network connection in a wireless network. The method comprises the steps of determining at least one quality measure for a channel of the network connection, estimating a quality condition for the channel based on the at least one quality measure, and selecting a packet type to be transmitted over the channel based on the quality condition.

In another aspect, the invention is related to a communications device for communicating over a network connection in a wireless network. The device comprises a channel quality processor for determining at least one quality measure of a channel of the network connection, and a channel condition processor coupled to the channel quality processor for estimating a quality condition of the channel based on the at least one quality measure. A packet type selector is coupled to the channel condition processor for selecting a packet type to be transmitted over the channel based on the channel quality condition.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
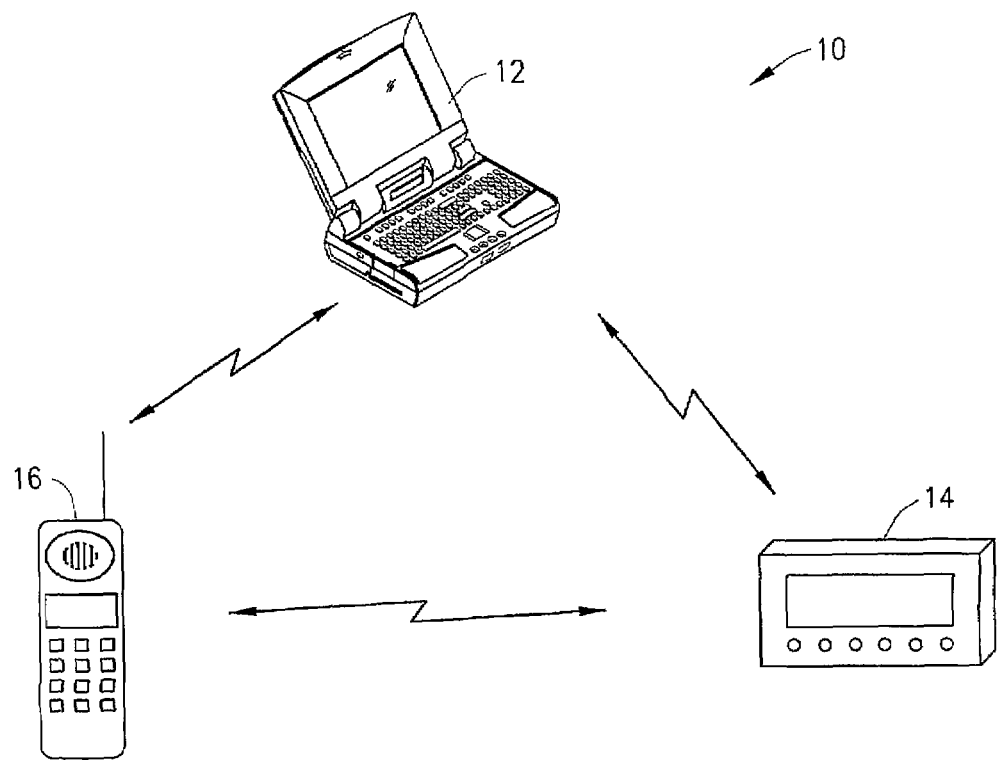
FIG. 1 illustrates a prior art ad hoc network.

The preferred embodiment of the present invention and its advantages are best understood by referring to the Drawings, wherein like numerals are used for like and corresponding parts.

Figure 2:
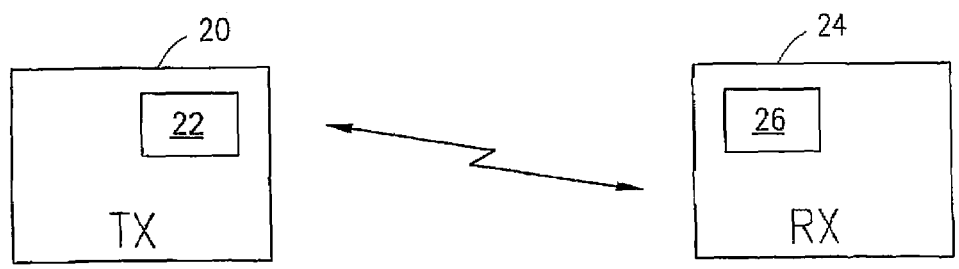
FIG. 2 illustrates an exemplary transmitter and receiver according to an embodiment of the invention.

As mentioned previously, the present invention provides a method and an apparatus for dynamically selecting a packet type based on one or more channel quality estimates. Referring now to FIG. 2, an exemplary ad hoc network connection is shown between two electronic devices. For convenient reference, the devices have been designated as a transmitter 20 and a receiver 24; however, those of ordinary skill in the art will understand that either device may function as a transmitter or receiver as needed. Each of the transmitter 20 and receiver 24 includes a radio unit 22 and 26, respectively, for sending and receiving information across the wireless network connection represented by the jagged line.

The channel quality estimates may be determined using channel information obtained from either the receiver 24, the transmitter 20, or both. In particular, the invention makes use of easily obtained parameters such as the transmitter side power, the RSSI value, the number of retransmissions, and in the case of an error correcting code, how many errors have been corrected. From the channel estimates, it can be determined whether interference or noise is the primary limiting factor. If it is interference, then steps may be taken to reduce the probability of interference by an interferer. If it is noise, coding and/or modulation may be used to enhance the resistance to noise.

In order to obtain channel information from both the receiver 24 and transmitter 20, the transmitter 20 needs to know how the receiver 24 works, and vice versa. This means that the quality measure algorithms to be employed on the transmitter 20 and receiver 24 may have to be specified in a standard. If no such specification exists in the standard, then one of the devices 20 and 24 should be able to control the signal traffic in both directions. It might also be that one of the devices 20 and 24 has an algorithm that is not working properly. In that case, it is desirable that the device with a properly working algorithm has the ability to "overrule" the algorithm of the other device in order to enhance the network performance.

Some of the channel quality measures used by the method and apparatus of the present invention will now be defined in a general sense.

$Q_{RSSI}$ represents a quality measure based on the RSSI value mentioned previously. This quality measure may be determined at the receiver side.

$Q_{PA}$ represents a quality measure based on the power at the transmitter side, for instance the voltage to the Power Amplifier, $V_{PA}$. This quality measure may be determined at the transmitter side.

$Q_{CRC}$ represents a quality measure indicating the fraction of packets that have been declared as correctly received by an error detection scheme using, for example, a Cyclic Redundancy Check (CRC) code. This quality measure may be determined at the receiver side.

$Q_{FEC}$ represents a quality measure indicating how many errors have been corrected by a Forward Error Correcting (FEC) code. This quality measure is only applicable when the FEC code is employed and may be determined at the receiver side.

$Q_{ARQ}$ represents a quality measure indicating the fraction of packets positively acknowledged based on the number of Automatic Repeat reQuests. This quality measure may be determined from the baseband at the transmitter side. Note that in a situation with no errors in the feedback from the receiver side to the transmitter side, $Q_{ARQ}$ would be the same as $Q_{CRC}$.

$Q_{TSYNC}$ represents a quality measure indicating how well the time synchronization is performed. For instance, in the case where the sampling time is found by correlating the received sequence with a known synchronization word, $Q_{TSYNC}$ can reflect the obtained correlation value at the time synchronization is found. $Q_{TSYNC}$ may be determined from the baseband component at the receiver side.

$Q_{FSYNC}$ represents a quality measure indicating how well the frequency synchronization is done. For instance, $1/Q_{FSYNC}$ may be used to represent the variance in the frequency estimate. $Q_{FSYNC}$ may be determined from the baseband component at the receiver side.

Following is a description of how the above quality measures can be updated, in very general terms, to obtain the most recent quality measures.

For example, the $Q_{RSSI}$ value for the (k+1)th packet can be updated using the RSSI value for the (k+1)th packet and the previous $Q_{RSSI}$ value as follows:

$$Q_{RSSI}(k+1)=f_{RSSI}(Q_{RSSI}(k),RSSI(k+1)) \quad (1)$$

where $f_{RSSI}$ denotes some function that can be used to update the $Q_{RSSI}$ quality measure.

In general, the function $f$ may be one of several two-variable functions to be described later herein that can be used to update the various quality measures. In order to emphasize that it is not necessary to use the same function with every quality measure, each function $f$ used herein has a subscript appended thereto corresponding to the particular quality measure being updated. For example, the function $f$ in equation (1) has the RSSI subscript appended thereto corresponding to the received signal strength quality measure $Q_{RSSI}$.

The $Q_{PA}$ value for the (k+1)th packet can be updated using the $V_{PA}$ value for the (k+1)th packet and the previous $Q_{PA}$ value as follows:

$$Q_{PA}(k+1)=f_{PA}(Q_{PA}(k),V_{PA}(k+1)) \quad (2)$$

The $Q_{CRC}$ value for the (k+1)th packet can be updated using the $M_{CRC}$ value for the (k+1)th packet and the previous $Q_{CRC}$ value, as shown below. The $M_{CRC}$ value equals 1 if the CRC is verified (i.e., packet is received correctly) and 0 otherwise.

$$Q_{CRC}(k+1) = f_{CRC}(Q_{CRC}(k), M_{CRC}(k+1)) \quad (3)$$

The $Q_{FEC}$ value for the (k+1)th packet can be updated using the $M_{FEC}$ value for the (k+1)th packet and the previous $Q_{FEC}$ value, as shown below. In general, $M_{FEC}$ is a momentary quality measure indicating the number of errors per packet per codeword (it is possible for one packet to have several codewords). The $M_{FEC}$ value is the number of errors that have been corrected by the FEC code.

$$Q_{FEC}(k+1) = f_{FEC}(Q_{FEC}(k), M_{FEC}(k+1)) \quad (4)$$

The $Q_{ARQ}$ value for the (k+1)th packet can be updated using the $M_{ARQ}$ value for the (k+1)th packet and the previous $Q_{ARQ}$ value, as shown below. The $M_{ARQ}$ value can either reflect whether the last transmitted packet was accepted at the other side, that is $M_{ARQ}=0$ or 1, or it can be the number of times a certain packet has been updated, i.e., $M_{ARQ}=0, 1, 2$, etc.

$$Q_{ARQ}(k+1) = f_{ARQ}(Q_{ARQ}(k), M_{ARQ}(k+1)) \quad (5)$$

The $Q_{TSYNC}$ value for the (k+1)th packet may be updated using the $M_{TSYNC}$ value for the (k+1)th packet and the previous $Q_{TSYNC}$ value, as shown below. The $M_{TSYNC}$ value reflects the quality of the time synchronization. In general, time synchronization may be obtained by correlating the received signal with a known "synchronization word." As such, $M_{TSYNC}$ may be a value in the range of, for example, 0 to Sync_Max to reflect this correlation, where Sync_Max is the maximum value corresponding to the best possible quality of the time synchronization.

$$Q_{TSYNC}(k+1) = f_{TSYNC}(Q_{TSYNC}(k), M_{TSYNC}(k+1)) \quad (6)$$

The $Q_{FSYNC}$ value for the (k+1)th packet may be updated using the $M_{FSYNC}$ value for the (k+1)th packet and the previous $Q_{FSYNC}$ value, as shown below. The $M_{FSYNC}$ value reflects the quality of the frequency synchronization. Typically, frequency offset does not change very much from one packet to another on the same link (i.e., for the same transmitter-receiver pair). Therefore, if the estimated frequency offset differs significantly for one packet, the link may be assumed to be a poor one, and the $M_{FSYNC}$ value chosen accordingly.

$$Q_{FSYNC}(k+1) = f_{FSYNC}(Q_{FSYNC}(k), M_{FSYNC}(k+1)) \quad (7)$$

The function $f$ which is used to update the above quality measures, as explained above, can be a number of different functions. Using the $Q_{CRC}$ quality measure as an example, these functions include:

Auto Regressive:

$$Q_{CRC}(k+1) = \lambda Q_{CRC}(k) + (1-\lambda) M_{CRC}(k+1) \quad (8)$$

where $\lambda$ represents a "forgetting factor," $0 \leq \lambda \leq 1$.

Moving Average:

$$Q_{CRC}(k+1) = \frac{1}{N} \sum_{n=k-N+2}^{k+1} M_{CRC}(n) \quad (9)$$

Average Up to Time (k+1):

$$Q_{CRC}(k+1) = \frac{1}{k+1} \sum_{n=1}^{k+1} M_{CRC}(n) \quad (10)$$

The method of the present invention can be divided into two parts. First, determine which packet type is the best to use for a certain channel condition. Second, determine via a selection algorithm when to change the packet type based on quality estimates of the channel conditions.

To determine which packet type is the best for a certain channel condition, the data rate and throughput for the different packet types can be found for different channel conditions. This information is typically obtained by simulation, but it can also be obtained by direct measurements if a test system is available. For convenient reference, the data rate and throughput for the different packet types of the Bluetooth™ wireless system has been tabulated in TABLE 1 and TABLE 2 below. Note that although the Bluetooth™ system is used here, the invention is not limited thereto and other suitable systems may be used without departing from the scope thereof.

TABLE 1 shows the achieved data rate in kbit/s for the different packet types, and TABLE 2 shows the corresponding throughput which is the probability that a packet is correctly received. By combining TABLE 1 and TABLE 2, one can determine both which packet type is optimum and also the throughput for the different packet types. The latter may become very useful knowledge in trying to get the selection algorithm to work properly.

TABLE 1

| Packet Type | DH5 | DH3 | DH1 | DM5 | DM3 | DM1 |
|---|---|---|---|---|---|---|
| $Pb = 10^{-2}$, $Pi = 0\%$ | 0 | 0 | 16 | 81 | 147 | 92 |
| $Pb = 10^{-3}$, $Pi = 0\%$ | 51 | 89 | 135 | 468 | 383 | 109 |
| $Pb = 10^{-4}$, $Pi = 0\%$ | 542 | 503 | 169 | 478 | 387 | 109 |
| $Pb = 10^{-5}$, $Pi = 0\%$ | 702 | 580 | 173 | 478 | 387 | 109 |
| $Pb = 10^{-6}$, $Pi = 0\%$ | 723 | 586 | 173 | 478 | 387 | 109 |
| $Pb = 10^{-2}$, $Pi = 1\%$ | 0 | 0 | 16 | 76 | 139 | 91 |
| $Pb = 10^{-3}$, $Pi = 1\%$ | 46 | 129 | 133 | 425 | 360 | 107 |
| $Pb = 10^{-4}$, $Pi = 1\%$ | 492 | 474 | 166 | 435 | 364 | 107 |
| $Pb = 10^{-5}$, $Pi = 1\%$ | 636 | 545 | 169 | 433 | 364 | 107 |
| $Pb = 10^{-6}$, $Pi = 1\%$ | 651 | 550 | 169 | 435 | 364 | 107 |
| $Pb = 10^{-2}$, $Pi = 5\%$ | 0 | 0 | 15 | 53 | 108 | 85 |
| $Pb = 10^{-3}$, $Pi = 5\%$ | 30 | 100 | 123 | 425 | 360 | 107 |
| $Pb = 10^{-4}$, $Pi = 5\%$ | 333 | 378 | 154 | 287 | 287 | 99 |
| $Pb = 10^{-5}$, $Pi = 5\%$ | 427 | 427 | 157 | 287 | 287 | 99 |
| $Pb = 10^{-6}$, $Pi = 5\%$ | 434 | 433 | 157 | 287 | 287 | 99 |
| $Pb = 10^{-2}$, $Pi = 10\%$ | 0 | 0 | 14 | 29 | 81 | 76 |
| $Pb = 10^{-3}$, $Pi = 10\%$ | 17 | 70 | 111 | 162 | 205 | 89 |
| $Pb = 10^{-4}$, $Pi = 10\%$ | 188 | 269 | 140 | 162 | 209 | 89 |
| $Pb = 10^{-5}$, $Pi = 10\%$ | 239 | 310 | 142 | 162 | 209 | 89 |
| $Pb = 10^{-6}$, $Pi = 10\%$ | 246 | 316 | 142 | 162 | 209 | 89 |
| $Pb = 10^{-2}$, $Pi = 15\%$ | 0 | 0 | 12 | 15 | 58 | 69 |
| $Pb = 10^{-3}$, $Pi = 15\%$ | 9 | 51 | 100 | 86 | 143 | 81 |
| $Pb = 10^{-4}$, $Pi = 15\%$ | 101 | 187 | 126 | 86 | 143 | 81 |
| $Pb = 10^{-5}$, $Pi = 15\%$ | 130 | 217 | 128 | 86 | 143 | 81 |
| $Pb = 10^{-6}$, $Pi = 15\%$ | 130 | 217 | 128 | 86 | 143 | 81 |

TABLE 2

| Packet Type | DH5 | DH3 | DH1 | DM5 | DM3 | DM1 |
|---|---|---|---|---|---|---|
| $Pb = 10^{-2}$, $Pi = 0\%$ | 0 | 0 | 0.095 | 0.17 | 0.30 | 0.85 |
| $Pb = 10^{-3}$, $Pi = 0\%$ | 0.070 | 0.23 | 0.78 | 0.98 | 0.99 | 1.00 |
| $Pb = 10^{-4}$, $Pi = 0\%$ | 0.75 | 0.86 | 0.98 | 1.00 | 1.00 | 1.00 |
| $Pb = 10^{-5}$, $Pi = 0\%$ | 0.97 | 0.99 | 1.00 | 1.00 | 1.00 | 1.00 |

TABLE 2-continued

| Packet Type | DH5 | DH3 | DH1 | DM5 | DM3 | DM1 |
|---|---|---|---|---|---|---|
| $P_b = 10^{-6}$, Pi = 0% | 1.00 | 1.00 | 1.00 | 1.00 | 1.00 | 1.00 |
| Pb = $10^{-2}$, Pi = 1% | 0 | 0 | 0.094 | 0.16 | 0.36 | 0.84 |
| Pb = $10^{-3}$, Pi = 1% | 0.064 | 0.22 | 0.77 | 0.89 | 0.93 | 0.98 |
| Pb = $10^{-4}$, Pi = 1% | 0.68 | 0.81 | 0.96 | 0.91 | 0.94 | 0.98 |
| Pb = $10^{-5}$, Pi = 1% | 0.88 | 0.93 | 0.98 | 0.91 | 0.94 | 0.98 |
| Pb = $10^{-6}$, Pi = 1% | 0.90 | 0.94 | 0.98 | 0.91 | 0.94 | 0.98 |
| Pb = $10^{-2}$, Pi = 5% | 0 | 0 | 0.087 | 0.118 | 0.28 | 0.78 |
| Pb = $10^{-3}$, Pi = 5% | 0.041 | 0.17 | 0.71 | 0.59 | 0.73 | 0.91 |
| Pb = $10^{-4}$, Pi = 5% | 0.46 | 0.64 | 0.89 | 0.60 | 0.74 | 0.91 |
| Pb = $10^{-5}$, Pi = 5% | 0.59 | 0.73 | 0.91 | 0.60 | 0.74 | 0.91 |
| Pb = $10^{-6}$, Pi = 5% | 0.60 | 0.74 | 0.91 | 0.60 | 0.74 | 0.91 |
| Pb = $10^{-2}$, Pi = 10% | 0 | 0 | 0.079 | 0.06 | 0.21 | 0.70 |
| Pb = $10^{-3}$, Pi = 10% | 0.024 | 0.12 | 0.64 | 0.34 | 0.53 | 0.82 |
| Pb = $10^{-4}$, Pi = 10% | 0.26 | 0.46 | 0.81 | 0.34 | 0.54 | 0.83 |
| Pb = $10^{-5}$, Pi = 10% | 0.33 | 0.53 | 0.82 | 0.34 | 0.54 | 0.82 |
| $P_b = 10^{-6}$, Pi = 10% | 0.34 | 0.54 | 0.82 | 0.34 | 0.54 | 0.82 |
| Pb = $10^{-2}$, Pi = 15% | 0 | 0 | 0.070 | 0.031 | 0.15 | 0.63 |
| Pb = $10^{-3}$, Pi = 15% | 0.013 | 0.088 | 0.58 | 0.18 | 0.37 | 0.74 |
| Pb = $10^{-4}$, Pi = 15% | 0.14 | 0.32 | 0.73 | 0.18 | 0.37 | 0.74 |
| Pb = $10^{-5}$, Pi = 15% | 0.18 | 0.37 | 0.74 | 0.18 | 0.37 | 0.74 |
| Pb = $10^{-6}$, Pi = 15% | 0.18 | 0.37 | 0.74 | 0.18 | 0.37 | 0.74 |

In the two tables, $P_b$ is the bit error probability due to noise when there is no interference, and $P_i$ is the probability that an interferer is present. In case an interferer is present, it is assumed herein that the packet is not correctly received, but has to be retransmitted. DMx and DHx represent coded and uncoded packet types, respectively, with 'x' representing the packet length. For example, DH3 is an uncoded packet having three times the length of a DH1 packet. Details of the different Bluetooth™ packet types can be found in the Bluetooth™ specification.

Consider now the case where $P_i=0\%$ so that the channel conditions are best approximated by one of the first five rows. Looking across each of the first five rows of TABLE 1, it can be seen that DH5 packets provide the highest data rate for rows 3–5. Next, by looking at the corresponding rows 3–5 in TABLE 2, it is readily seen that a necessary condition for DH5 packets to be the optimum choice is that the throughput be about 0.70 or more. If the throughput for DH5 packets drops to, say, 0.10, then it is probably desirable to switch to DM5 type packets instead. The reason is because the drop in throughput is likely due to noise (recall $P_i=0\%$), and the coded DMx type packets would be more noise resistant, thus allowing the network to operate at a lower signal-to-noise ratio (SNR).

Next, assume that DH5 packets are used and $P_i=5\%$, meaning that the network is interference limited. Now, assume the DH5 throughput drops to 0.60. No packet type switch should be made yet because DH5 packets still provide the highest throughput of the available packet types. As can be seen from TABLE 2, a throughput of 0.60 means that $P_b$ is about $10^{-6}$. Therefore, considering the corresponding row in TABLE 1, it can be seen that DH5 gives the highest data rate. However, if the throughput becomes even smaller, one may consider switching to the shorter DH3 packets in order to decrease the probability that a packet will be corrupted by the interference. Note that the coded DMx type packets should probably not be selected because, in general, encoding schemes are more effective in noise limited environments.

From the foregoing, it should be clear that an optimal packet type may be selected based on information about the channel conditions. Following is a description of an algorithm that can be used to switch the packet type based on information about changes in the channel conditions, in accordance with the present invention.

The algorithm estimates the channel conditions using one or more of the updated quality measures mentioned previously to determine whether the system is noise or interference limited, i.e., which rows in TABLES 1 and 2 best describe the current channel conditions. In one exemplary embodiment, if coded DMx packets are used, one can combine the information from the $Q_{CRC}$ and $Q_{FEC}$ values available at the receiver side to determine whether any errors have been corrected in those packets that were accepted as correct. For instance, equation (8) can be used for both $Q_{CRC}$ and $Q_{FEC}$ with $M_{FEC}=1$ if no errors have been corrected, and $M_{FEC}=0$ otherwise. If $Q_{CRC} \cong Q_{FEC}$, then for almost all packets that were accepted, no errors were corrected. Consequently, an error correcting scheme would be of little use under such channel conditions, and the network should therefore be switched to uncoded DHx type packets. On the contrary, if $Q_{CRC} \gg Q_{FEC}$, then for a majority of the accepted packets, at least one bit was corrected. Accordingly, use of the coded DMx type packets should be continued because retransmissions will be increased if there is no error correction.

In another exemplary embodiment, by using the $Q_{RSSI}$ and $Q_{CRC}$ values which are found at the receiver side, it is possible to deduce the case where the received signal strength is good (e.g., above a predefined level), yet the throughput is still low. In that case, interference may be considered to be the limiting factor and, hence, error coding would have little effect on the throughput. If $Q_{RSSI}$ is low, however, then noise may be considered to be the limiting factor. In that case, error coding may be used to increase the throughput if this is not already the case, or the output power of the transmitter side may be increased (unless it is already transmitting at the maximum power).

In yet another exemplary embodiment, the algorithm uses the $Q_{ARQ}$ and $V_{PA}$ values which are found at the transmitter side to estimate the channel conditions. If $V_{PA}$ is not at the maximum specified value, then the receiver side probably already has a sufficiently high RSSI value and does not require a stronger signal. Otherwise, assuming power control is implemented, the receiver side would have requested increased transmitter side power had the received signal strength been too low. Accordingly, because the received signal strength is sufficient, noise is probably not the limiting factor. Consequently, if $Q_{ARQ}$ is still small, the packet type should be switched to a $Q_{ARQ}$ that is less affected by interference, for instance, shorter packets. However, if $V_{PA}$ is at the maximum specified value, then noise is probably the limiting factor, and more robust packets from a noise standpoint should be used. For example, more robust signal modulation may be used, such as reducing the number of signal points in the constellation if phase shift keying (PSK) is used, or DMx packets with an error correcting code (of lower rate) should be used.

In still another exemplary embodiment, the three previous embodiments can be combined to produce estimates of the channel conditions. In particular, since the first two embodiments employed information obtained from the receiver side, this information can be fed back to the transmitter side and subsequently combined with the third embodiment.

In still another exemplary embodiment, the transmitter side algorithm may override the receiver side algorithm. In general, it is the transmitter side that controls which packet type is to be transmitted, but the receiver side may make requests based on receiver side estimates of channel conditions. However, the transmitter side may choose to ignore the inputs from the receiver side if the transmitter side determines the requests to be unreliable or incorrect. For example, if the receiver side requests uncoded packets in spite of the fact that $V_{PA}$ is at the maximum value and $Q_{ARQ}$ is small, the transmitter side can decide to switch to coded packets anyway.

Figure 3:
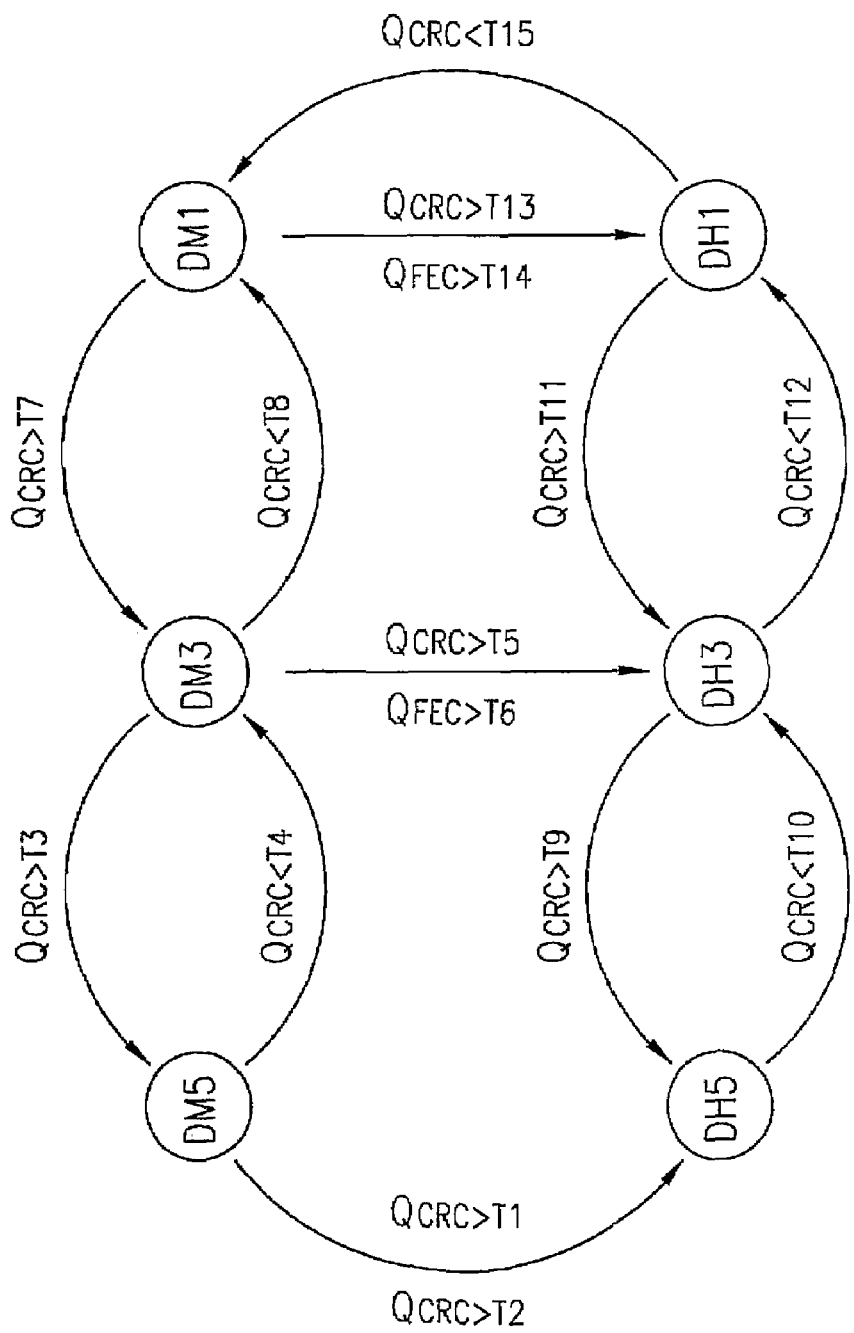
FIG. 3 illustrates an example of a packet selection algorithm according to an embodiment of the present invention.

Referring now to FIG. 3, a state diagram illustrating an exemplary algorithm is shown with each state representing a different packet type. There are six packet types shown with DHx and DMx representing uncoded and coded packets, respectively, and 'x' indicating the relative lengths of the packets. In this particular embodiment, $Q_{FEC}$ and $Q_{CRC}$ are the quality measures used and T1–T15 represent quality threshold values that have been predefined for the particular network. Note that where dual arrows are shown, both quality measures must meet the required threshold values before a change may take place.

As can be seen from the diagram, a change from one packet type to another may be made if certain channel conditions exist. For example, if $Q_{CRC}$ and $Q_{FEC}$ are greater than the predefined quality thresholds T1 and T2 respectively, indicating that the number of packets corrected by the FEC code and, hence, the number of packets confirmed as correct are sufficiently high, then coded packets may no longer be necessary and a switch from coded DM5 packets to uncoded DH5 packets may be made. Similarly, if $Q_{CRC}$ is less then a predefined quality threshold T4, indicating that the number of packets confirmed as correct is too low, a switch from DM5 to shorter DM3 packets may be made to improve the $Q_{CRC}$ value. The remainder of the diagram should be self-explanatory and, therefore, will not be described further.

A problem may occur if an algorithm is designed based on $Q_{CRC}$ alone such that it is not possible to determine whether the network is noise or interference limited. For example, consider a system that is noise limited so that coding is needed, but the throughput is very high so that based on $Q_{CRC}$ alone, a switch from DM5 to DH5 would be (improperly) made. Since coding is still needed, the algorithm would subsequently change the packet type according to the following order: DH3, DH1, DM1, DM3 and then back to DM5. Now, if the channel conditions have not changed, this means that the high throughput would again indicate a change should be made to DH5 packets, and the loop would start all over.

Figure 4:
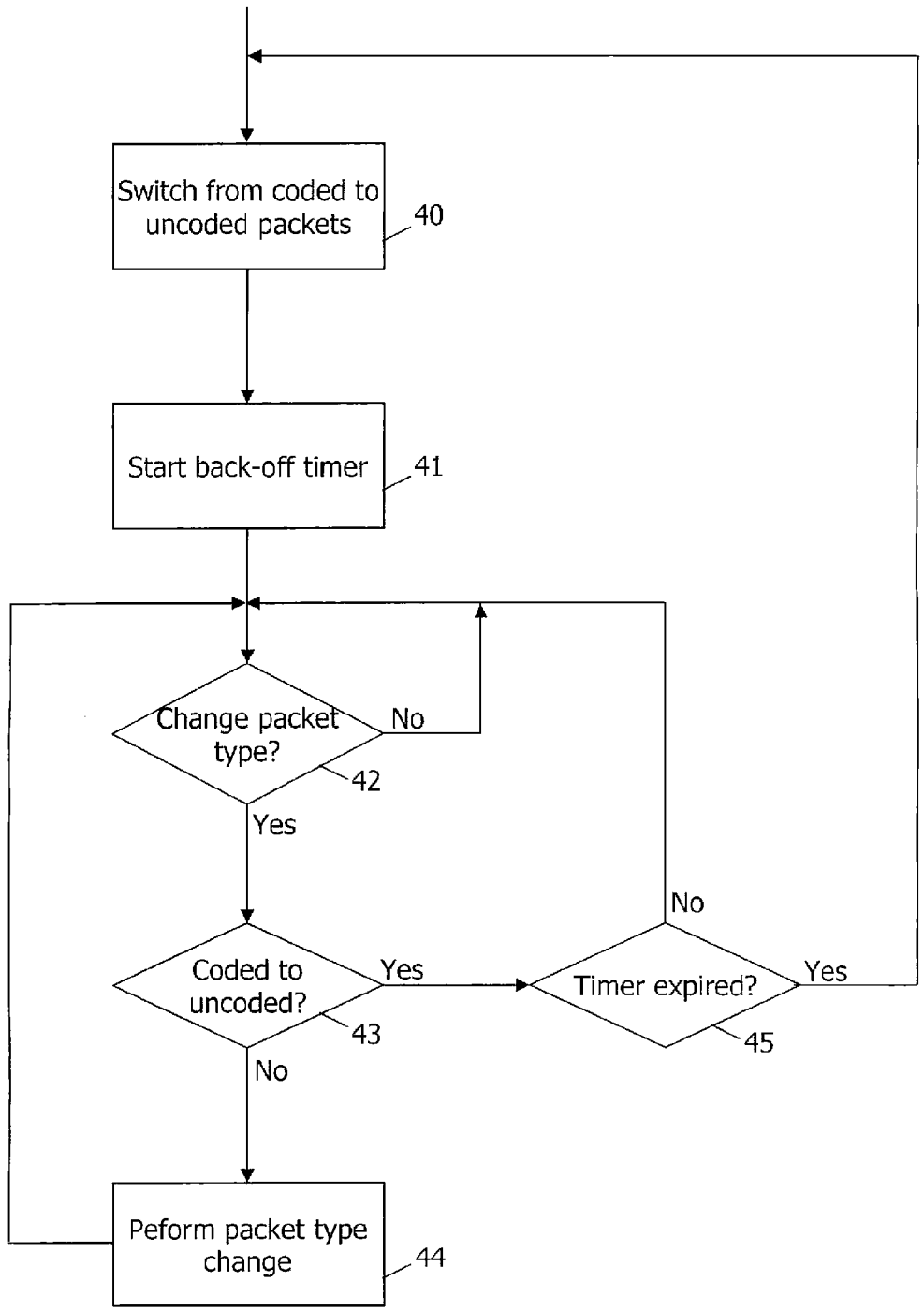
FIG. 4 illustrates a flow chart of one aspect of the method of the present invention.

In still another exemplary embodiment, in order not to get stuck in such a loop, a back-off timer may be used, as will now be described in conjunction with the process shown in FIG. 4. Consider the case where it is not possible to determine whether the network is noise or interference limited by combining two or more quality measures. Using a quality measure for the throughput such as $Q_{CRC}$ for the receiver side or $Q_{ARQ}$ for the transmitter side, a back-off timer may be introduced. For example, after a switch in packet type from coded to uncoded has been made (step 40), a back-off timer of, say, 10 seconds is started (step 41). Thereafter, a determination is made as to whether a subsequent change in packet type is desired (step 42). If no, the determination is repeated until an affirmative answer is received. Upon obtaining a yes, a determination is made as to whether the desired changed is from coded to uncoded packet types (step 43). If no, then it is not necessary to delay the process and the desired packet type change can be performed accordingly (step 44). However, if yes, then a determination is made as to whether the back-off timer is expired (step 45). The back-off timer helps to prevent the loop situation described above by requiring the algorithm to wait a predefined period of time before making another coded to uncoded packet type change. Thus, if the back-off timer has not expired, the desired change may not be made and the process goes to back to checking whether a packet type change is desired (step 42). If the back-off timer has expired, then the switch from coded to uncoded packet type may be made as needed (step 40).

Figure 5:
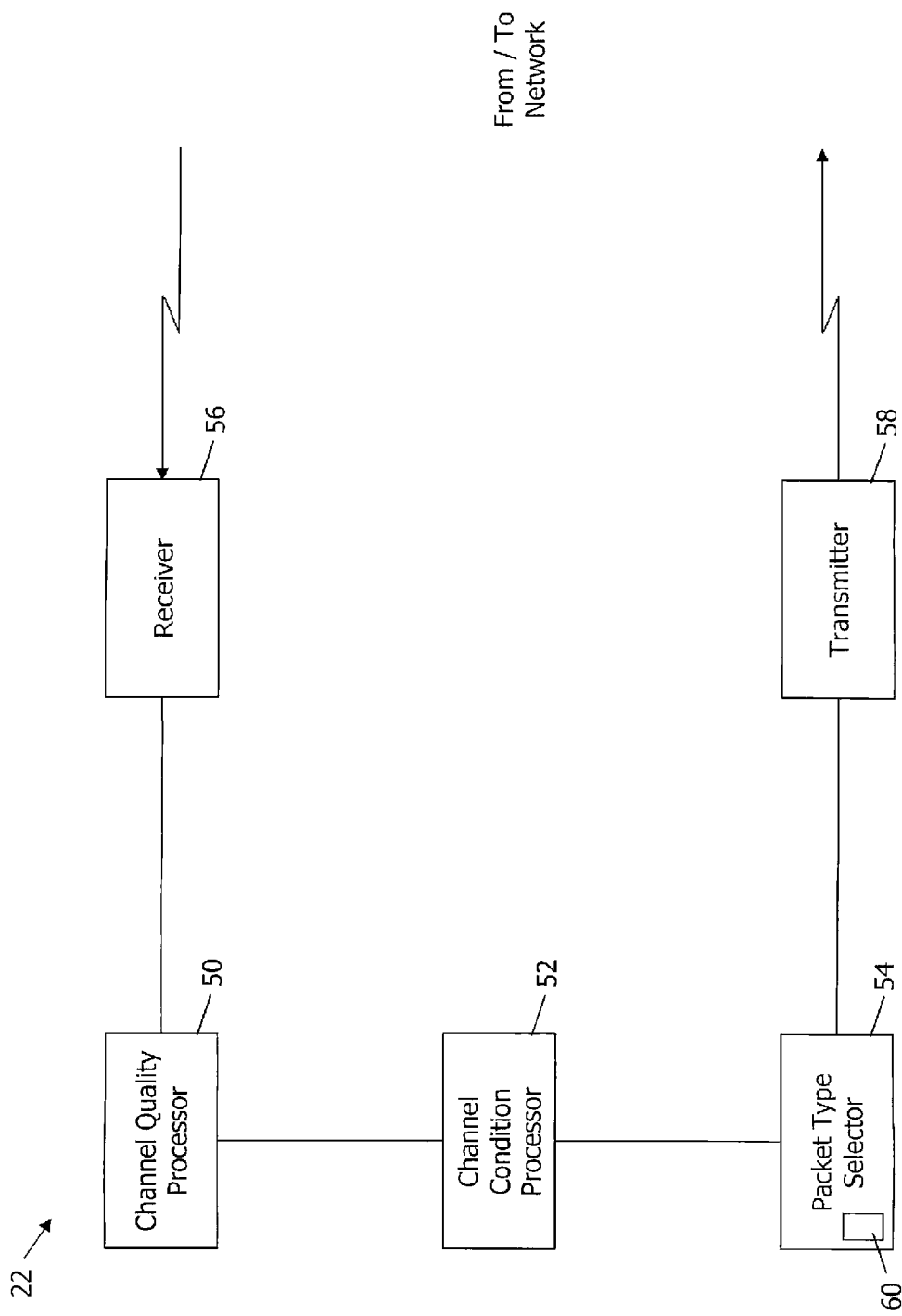
FIG. 5 illustrates a functional block diagram according to an embodiment of the present invention.

Referring now to FIG. 5, a functional block diagram of an exemplary radio unit 22 is shown. It should be noted that the radio unit 22 and the radio unit 26 are similar in function and, therefore, only the radio unit 22 will be described here. In the exemplary embodiment, the radio unit 22 includes at least a channel quality processor 50, a channel condition processor 52, a packet type selector 54, a receiver unit 56, and a transmitter unit 58. Although shown as discrete components here, those of ordinary skill in the art will understand that the blocks may be integrated into a single block having the functions of all the components, or some combination of discrete and integrated components.

The channel quality processor 50 obtains and updates the channel quality measures in the manner described previously and at predefined intervals as specified in the radio unit 22. Based on the updates of the channel quality measures, the channel condition processor 52 analyzes one or more of these quality measures in order to make an estimate of the current channel condition, e.g., whether the channel is noise or interference limited. Thereafter, the packet type selector 54 selects the type of packet to be used that will minimize the effects of the noise and/or interference on the network connection. If the optimum packet type is already selected, then the packet type selector 54 may simply retain that packet type.

The receiver unit 56 receives packets transmitted over the network and forwards them to the channel quality processor 50. From the packets received by the receiver unit 56, certain receiver side quality measures may be determined such as the $Q_{CRC}$, $Q_{RSSI}$, and $Q_{FEC}$ values. Finally, the transmitter unit 58 transmits information across the network using the packet type selected by the packet type selector 54. From the packets transmitted by the transmitter unit 58, certain quality measures such as the $Q_{PA}$ and $Q_{ARQ}$ values may be determined by the channel quality processor 50.

In some embodiments, the packet type selector also includes the back-off timer 60 described previously to prevent a coded to uncoded packet type switch from occurring within a predefined amount of time.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving a network connection in a wireless network, said method comprising the steps of:
    determining at least one quality measure for a channel of said network connection;
    continuously estimating, by a transmitter in a network, a quality condition for said channel based on said at least one quality measure, such estimation made by the transmitter based on at least one parameter selected from a group consisting of a transmitter power value ($Q_{PA}$), and a number of retransmissions ($Q_{ARQ}$);
    dynamically determining from the continuously estimated quality condition whether the channel is primarily noise limited or primarily interference limited wherein the step of dynamically determining whether the channel is primarily noise limited or interference limited is performed individually for different packet types; and selecting a packet type to be transmitted by the transmitter over said channel based on the determination of whether the channel is primarily noise limited or primarily interference limited.

2. The method according to claim 1, wherein which one of said at least one quality measure is determined varies depending on a previously selected packet type.

3. The method according to claim 1, wherein an uncoded packet type is selected if said channel is primarily interference limited.

4. The method according to claim 1, wherein a coded packet type is selected if said channel is primarily noise limited.

5. The method according to claim 1, wherein a relatively short packet type is selected if said channel has a high bit error rate.

6. The method according to claim 1, wherein a relatively long, uncoded packet type is selected if said channel is neither interference limited nor noise limited.

7. The method according to claim 1, wherein said selected packet type is the same as a previously selected packet type.

8. The method according to claim 1, wherein said selected packet type is different from a previously selected packet type.

9. The method according to claim 1, wherein said network is an ad hoc network.

10. The method according to claim 1, wherein said network is a Bluetooth™ wireless network.

11. The method according to claim 1, wherein said step of estimating said quality condition includes comparing said at least one quality measure to a predefined value.

12. The method according to claim 1, wherein said step of selecting a packet type includes waiting for a predefined time period before selecting said packet type.

13. A communications device for communicating over a network connection in a wireless network, said device comprising:

a transmitter having a channel quality processor for determining at least one quality measure of a channel of said network connection;

a channel condition processor coupled to said channel quality processor adapted to continuously estimate a quality condition of said channel based on said at least one quality measure, wherein said estimation is based on at least one quality measure parameter selected from a group consisting of transmitter power value ($Q_{PA}$) and the number of retransmissions ($Q_{ARQ}$);

the channel condition processor further adapted to dynamically determine, based on the continuously estimated quality condition, whether the channel is primarily noise limited or primarily interference limited;

a packet type selector coupled to the channel condition processor adapted to select a packet type to be transmitted over said channel based on the dynamic determination of whether the channel is primarily noise limited or primarily interference limited;

the channel condition processor being adapted to estimate and determine whether the channel is primarily noise limited or interference limited from packet to packet; and wherein the channel condition processor is further adapted to determine whether the channel is primarily noise limited or interference limited individually for different packet types.

14. The communications device according to claim 13, wherein which one of said at least one quality measure is determined varies depending on a previously selected packet type.

15. The communications device according to claim 13, wherein said packet type selector selects an uncoded packet type if said channel condition processor determines that said channel is primarily interference limited.

16. The communications device according to claim 13, wherein said packet type selector selects a coded packet type if said channel condition processor determines that said channel is primarily noise limited.

17. The communications device according to claim 13, wherein said packet type selector selects a relatively short packet type if said channel condition processor determines that said channel has a high bit error rate.

18. The communications device according to claim 13, wherein said packet type selector selects a relatively long, uncoded packet type if said channel condition processor determines that said channel is neither interference limited nor noise limited.

19. The communications device according to claim 13, wherein said selected packet type is the same as a previously selected packet type.

20. The communications device according to claim 13, wherein said selected packet type is different from a previously selected packet type.

21. The communications device according to claim 13, wherein said network is an ad hoc network.

22. The communications device according to claim 13, wherein said network is a Bluetooth™ wireless network.

23. The communications device according to claim 13, wherein said channel condition processor is configured to compare said at least one quality measure to a predefined value.

24. The communications device according to claim 13, further comprising a timer, wherein said packet type selector is adapted to wait for said timer to expire before selecting said packet type.

25. The method of claim 1, wherein the continuously estimating by the transmitter of a quality condition based on the transmitter power value ($Q_{PA}$) depends on the voltage applied across the power amplifier of the transmitter ($V_{PA}$).

26. The method of claim 25, further comprising updating the QPA value for the (k+1)th packet using a $V_{PA}$ value for the (k+1)th packet and a previous $Q_{PA}$ value as follows:

$$Q_{PA}(k+1) = f_{PA}(Q_{PA}(k), V_{PA}(k+1)),$$

where $f_{PA}$ denotes a function used to update the $Q_{PA}$ quality measure.

27. The method of claim 26 wherein the function $f_{PA}$ is one selected from the group consisting of an auto regressive function; a moving average function and an average up to time (k+1) function.

28. The method of claim 1, wherein the continuously estimating, by a transmitter in a network, of a quality condition based on the number of retransmissions ($Q_{ARQ}$) further comprises the step of updating the $Q_{ARQ}$ value for the (k+1)th packet using a $M_{ARQ}$ value for the (k+1)th packet and a previous $Q_{ARQ}$ value.

29. The method of claim 28, wherein the $M_{ARQ}$ value can reflect whether the last transmitted packet was accepted at the other side or the number of times a packet has been updated.

30. The method of claim 1, further comprising the step of determining, without trial and error, how many errors have been corrected by the code and, based on that result, if the code rate should be changed.

31. The method of claim 13 further comprising the channel condition processor adapted to adjust packet size and forward error correction capability in dependence on each other.

32. The method of claim 13, further comprising the channel condition processor adapted to determine, without trial and error, how many errors have been corrected by the code and, based on that result, if the code rate should be changed.

33. A method for improving a network connection in a wireless network, said method comprising the steps of:
   determining at least one quality measure for a channel of a network connection;
   continuously estimating, by a receiver in a network, a quality condition for said channel based on at least one quality measure selected from a group consisting of: an RSSI value ($Q_{RSSI}$); an error detection scheme ($Q_{CRC}$); a forward error correction code (FEC) ($Q_{FEC}$); a time synchronization ($Q_{TSYNC}$); and a frequency synchronization ($Q_{FSYNC}$);
   dynamically determining from the estimated quality condition whether the channel is primarily noise limited or primarily interference limited, wherein the step of dynamically determining whether the channel is primarily noise limited or interference limited is performed individually for different packet types; and
   selecting a packet type to be transmitted over said channel based on the determination of whether the channel is primarily noise limited or primarily interference limited.

34. The method of claim 33, further comprising the step of determining, without trial and error, how many errors have been corrected by the code and, based on that result, if the code rate should be changed.

35. The method of claim 33, wherein the step of continuously estimating, by a receiver, of a quality condition based on an RSSI value ($Q_{RSSI}$) further comprises updating the $Q_{RSSI}$ value for the (k+1)th packet using the RSSI value for the (k+1)th packet and the previous $Q_{RSSI}$ value as follows:

$$Q_{RSSI}(k+1) = f_{RSSI}(Q_{RSSI}(k), RSSI(K+1))$$

where $f_{RSSI}$ denotes a function for updating the $Q_{RSSI}$ quality measure.

36. The method of claim 35 wherein the function is one selected from the group consisting of an auto regressive function; a moving average function and a average up to time (k+1) function.

37. The method of claim 33, wherein the step of continuously estimating, by a receiver of a quality condition is based on a number of packets that have been declared as having been correctly received using an error detection scheme ($Q_{CRC}$) further comprises the step of updating the $Q_{CRC}$ using an $M_{CRC}$ value for the (k+1)th packet and a previous $Q_{CRC}$ value.

38. The method of claim 33, wherein the step of continuously estimating, by a receiver of a quality condition based on a number of errors corrected using a forward error correction code (FEC) ($Q_{FEC}$) further comprises the step of updating the $Q_{FEC}$ using an $M_{FEC}$ value for the (k+1)th packet and a previous $Q_{FEC}$ value, where $M_{FEC}$ is a momentary quality measure indicating the number of errors per packet per codeword, as follows: $Q_{FEC}(k+1) = F_{FEC}(Q_{FEC}(k), M_{FEC}(k+1))$.

39. The method of claim 33, wherein the step of continuously estimating, by a receiver of a quality condition based on how well time synchronization is performed ($Q_{TSYNC}$) further comprises the step of updating the $Q_{TSYNC}$ value for the (k+1)th packet using an $M_{TSYNC}$ value for the (k+1)th packet and a previous $Q_{TSYNC}$ value wherein the $M_{TSYNC}$ value reflects the quality of a time synchronization.

40. The method of claim 39, further comprising the step of obtaining the time synchronization by correlating the received signal with a known synchronization word.

41. The method of claim 33, wherein the step of continuously estimating, by a receiver of a quality condition based on how well frequency synchronization is performed ($Q_{FSYNC}$) further comprises the step of updating the $Q_{FSYNC}$ value for the (k+1)th packet by using an $M_{FSYNC}$ value for the (k+1)th packet and a previous $Q_{FSYNC}$ value, wherein the $M_{FSYNC}$ value reflects the quality of the frequency synchronization.

42. The method of claims 33, wherein the continuously estimating step is made by the receiver and a transmitter working in tandem based on a standardized algorithm.

43. A communications device for communicating over a network connection in a wireless network, said device comprising:
   a receiver having a channel quality processor for determining at least one quality measure of a channel of said network connection;
   a channel condition processor coupled to said channel quality processor adapted to continuously estimate a quality condition of said channel based on said at least one quality measure, wherein said estimation based on at least one quality measure parameter selected from a group consisting of an RSSI value ($Q_{RSSI}$); an error detection scheme ($Q_{CRC}$); a forward error correction code (FEC) ($Q_{FEC}$); a time synchronization scheme ($Q_{TSYNC}$); and a frequency synchronization ($Q_{FSYNC}$) scheme;
   the channel condition processor further adapted to dynamically determine, based on the estimated quality condition, whether the channel is primarily noise limited or primarily interference limited;
   a packet type selector coupled to the channel condition processor adapted to select a packet type to be transmitted over said channel based on the determination of whether the channel is primarily noise limited or primarily interference limited;
   the channel condition processor being adapted to estimate and determine whether the channel is primarily noise limited or interference limited from packet to packet; and
   wherein the channel condition processor is further adapted to determine whether the channel is primarily noise limited or interference limited individually for different packet types.

44. The communications device of claim 43, wherein the channel condition processor continuously estimates the quality condition by working in tandem with a transmitter based on a standardized algorithm.

45. The communications device according to claim 43, wherein the choice of at least one quality measure varies depending on a previously selected packet type.

46. The communications device according to claim 43, wherein the packet type selector selects an uncoded packet type if the channel condition processor determines that the channel is primarily interference limited.

47. The communications device according to claim 43, wherein the packet type selector selects a coded packet type if the channel condition processor determines that the channel is primarily noise limited.

48. The communications device according to claim 43, wherein the packet type selector selects a relatively short packet type if the channel condition processor determines that the channel has a high bit error rate.

49. The communications device according to claim 43, wherein the packet type selector selects a relatively long, uncoded packet type if the channel condition processor determines that the channel is neither interference limited nor noise limited.

50. The communications device according to claim 43, wherein the selected packet type is the same as a previously selected packet type.

51. The communications device according to claim 43, wherein the selected packet type is different from a previously selected packet type.

52. The communications device according to claim 43, wherein the network is an ad hoc network.

53. The communications device according to claim 43, wherein the network is a Bluetooth™ wireless network.

54. The communications device according to claim 43, wherein the channel condition processor is configured to compare said at least one quality measure to a predefined value.

55. The communications device according to claim 43, further comprising a timer, wherein the packet type selector is adapted to wait for the timer to expire before selecting the packet type.

56. The communications device according to claim 43, wherein the channel condition processor is configured to ignore transmitter side quality measures and to use only quality measures determined based on information obtained from the receiver.

57. The communications device according to claim 43, wherein the channel condition processor is adapted to adjust packet size and forward error correction capability in dependence on each other.

58. The communications device according to claim 43, wherein the channel condition processor adapted to determine, without trial and error, how many errors have been corrected by the code and, based on that result, if the code rate should be changed.

* * * * *

UNITED STATES PATENT AND TRADEMARK OFFICE
CERTIFICATE OF CORRECTION

| | |
|---|---|
| PATENT NO. | : 7,095,719 B1 |
| APPLICATION NO. | : 09/706071 |
| DATED | : August 22, 2006 |
| INVENTOR(S) | : Wilhelmsson et al. |

Page 1 of 1

It is certified that error appears in the above-identified patent and that said Letters Patent is hereby corrected as shown below:

In Column 7, Table 2-continued, under "Packet Type", Line 1, delete "$P_b$" and insert -- Pb --, therefor.

In Column 7, Table 2-continued, under "Packet Type", Line 16, delete "$P_b$" and insert -- Pb --, therefor.

In Column 12, Line 52, in Claim 26, delete "QPA" and insert -- $Q_{PA}$ --, therefor.

In Column 13, Line 48, in Claim 35, delete "(K+1)" and insert -- (k+1) --, therefor.

Signed and Sealed this

Tenth Day of March, 2009

JOHN DOLL
*Acting Director of the United States Patent and Trademark Office*